US009061488B2

(12) United States Patent
Kanaoka et al.

(10) Patent No.: US 9,061,488 B2
(45) Date of Patent: Jun. 23, 2015

(54) IMAGE FORMING APPARATUS

(75) Inventors: Yukio Kanaoka, Osaka (JP); Takashi Matsuda, Osaka (JP); Kanji Mizusugi, Osaka (JP); Naoki Saito, Osaka (JP); Atsushi Kaseno, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 33 days.

(21) Appl. No.: 13/533,434

(22) Filed: Jun. 26, 2012

(65) Prior Publication Data
US 2013/0047874 A1 Feb. 28, 2013

(30) Foreign Application Priority Data

Aug. 25, 2011 (JP) ................... 2011-183330

(51) Int. Cl.
G03G 21/00 (2006.01)
B41J 3/00 (2006.01)
H04N 1/00 (2006.01)
G03G 21/16 (2006.01)

(52) U.S. Cl.
CPC ............... *B41J 3/00* (2013.01); *H04N 1/00493* (2013.01); *G03G 21/1604* (2013.01); *G03G 21/1614* (2013.01)

(58) Field of Classification Search
CPC ........................ G03G 21/1614; H04N 1/00493
See application file for complete search history.

(56) References Cited

U.S. PATENT DOCUMENTS

2002/0051198 A1  5/2002  Kurita
2010/0260527 A1  10/2010  Webster et al.

FOREIGN PATENT DOCUMENTS

| JP | 2002-139966 A | 5/2002 |
| JP | 2002-287450 A | 10/2002 |
| JP | 2005-151367 A | 6/2005 |
| JP | 2005-292855 A | 10/2005 |
| JP | 3974625 | 6/2007 |
| JP | 2008-026919 A | 2/2008 |
| JP | 2008-033355 A | 2/2008 |
| JP | 4333965 | 7/2009 |

OTHER PUBLICATIONS

URL:http://www.usa.canon.com/cpr/pdf/Brochures/copier_ir_4570_3570_brochure_july_2006.pdf Title:imageRunner 4570/3570 Date: 2006 Pertinent pp. 1-8.*

* cited by examiner

*Primary Examiner* — Blake A Tankersley
*Assistant Examiner* — Ruben Parco, Jr.
(74) *Attorney, Agent, or Firm* — Renner, Otto, Boisselle & Sklar, LLP

(57) ABSTRACT

An image forming apparatus allowing a user to easily access an operating section even in a large-size apparatus can be provided. An image forming apparatus 100 includes a main machine 110 including an operating section 113 and capable of functioning as a multifunction machine by itself, and at least one option machine 120 to 190 added to a side-face side of an enclosure 111 of the main machine. The apparatus 100 includes the operating section 113 at a fixed position in the width direction of the enclosure. The enclosure has a unified first color of a same tone at a front face thereof, and an operating position line 101 is formed at a part of the front face of the enclosure and has a second color that is clearly different from the first color so as to be a guide indicating a position of the operating section 113.

19 Claims, 3 Drawing Sheets

☐ 1st COLOR (BRIGHT COLOR)
▦ 2nd COLOR (DARK COLOR)
▨ 3rd COLOR (DARK COLOR)

IMAGE FORMING APPARATUS

CROSS REFERENCE

This Nonprovisional application claims priority under 35 U.S.C. §119(a) on Patent Application No. 2011-183330 filed in Japan on Aug. 25, 2011, the entire contents of which are hereby incorporated by reference.

BACKGROUND OF THE INVENTION

The present invention relates to image forming apparatuses and particularly relates to image forming apparatuses configured to additionally and optionally include option machines such as a sheet feeder and a post-processor on a side-face side of an enclosure of a main machine capable of functioning as a multifunction machine by itself.

Along with increasing demands for large-volume printing (production printing) and development of more sophisticated and diversified post-processing functions these days, image forming apparatuses (hereinafter they may be called simply "apparatuses") additionally include option machines such as a large-capacity feeding cassette, a saddle finisher, a bookbinding machine and a stacker on a side-face side of an enclosure of a main machine capable of functioning as a multifunction machine by itself, and so the apparatuses tend to become larger in size. These added option machines are still operated in a centralized manner using an operating panel provided at the main machine.

In such an apparatus, the position of an operating section in the entire apparatus (hereinafter the position may be called an "operating position") varies with the attachment state of the option machines. As for the appearance of the apparatus including enclosures (cabinets), the apparatus has a unified whitish color that is muted and match with any office environment, and the apparatus even with the option machines attached thereto is configured to create a sense of uniformity using a similar tone of colors of the apparatus as a whole. In such a circumstance, the operating position is sometimes ambiguous for users unfortunately. Especially a user in a wheelchair has to find the operating position from a lower position of eyes, and it is difficult for such users to tell the position of the operating section when they are accessing the apparatus from a distance, thus retarding the users from reaching a target position and degrading the operability.

For instance, Japanese Patent No. 3974625 and Japanese Patent No. 4333965 show a so-called in-body copy receiving type image forming apparatus configured to differentiate the surrounding of an in-body copy receiving section from the entire apparatus in color and brightness so as to clarify the position of the in-body copy receiving section.

The techniques described in these documents, however, are aimed to improve the viewability of sheets output to the in-body copy receiving section or to avoid the impression of fragile of the apparatus as a whole, and are not aimed to clarify the position of the operating section.

In view of the problem, it is an object of the present invention to provide an image forming apparatus allowing a user to easily access an operating section even in a large-size apparatus.

SUMMARY OF THE INVENTION

An image forming apparatus includes an operating section at a fixed position in the width direction of an enclosure. In the image forming apparatus of the present invention, the enclosure has a unified first color of a same tone at a front face thereof, and a part of the front face of the enclosure has a second color that is clearly different from the first color so as to be a guide indicating a position of the operating section.

With this configuration, the part of the front face of the enclosure having the second color that is clearly different from the first color becomes a guide for the operating section. This configuration makes the operating position clear without degrading the overall design concept of the apparatus.

Especially when the image forming apparatus includes a main machine including the operating section and capable of functioning as a multifunction machine by itself, and at least one option machine added to a side-face side of an enclosure of the main machine, the overall length in breadth of the apparatus becomes long, and therefore the position of the operating section tends to be ambiguous for users. In such a case, the present invention is effective.

The part of the front face of the enclosure preferably is in a vicinity of the operating section. With this configuration, when a user accesses the part of the front face of the enclosure as a guide, then the operating section will be located in the vicinity of the part. Accordingly, the user can operate the operating section promptly, and therefore the operability can be improved.

The part of the front face of the enclosure preferably includes a linear part at a position substantially agreeing with the operating section in the width direction of the enclosure, the linear part having a width substantially equal to a width of the operating section and extending from an upper end part to a lower end part of the front face of the enclosure. With this configuration, even when there is a vertically oriented glass window on the front face of the enclosure, such a glass is not so long as to extend from the upper end part to the lower end part of the enclosure, and therefore false recognition of the part of the enclosure indicating the operation position as a glass window can be prevented.

Work spaces such as an auto document feeder, a document platen, a working table used for sorting of documents and copies are unevenly distributed on a top-face side of the enclosure of the main machine and the enclosure of the option machine. Such work spaces may be of a third color clearly different from the first color as the unified color of the enclosure front face, which clarifies the position of the work space.

The enclosure of the main machine and the enclosure of the option machine at an upper edge part of the front faces may be of a same color as the third color. With this configuration, when the enclosure has an open/closable part at an upper part, the boundary can be easily found. Herein the enclosure of the main machine and the enclosure of the option machine may have a unified height. The upper edge part of the enclosure front face will be recognized as a line of the third color clearly different from the unified color of the enclosure front face, and therefore the apparatus can be designed without a feeling of awkwardness.

The second color and the third color may be a same or similar color, whereby the apparatus can be muted colored without a feeling of awkwardness.

According to the present invention, an operating position of an image forming apparatus even in a large size can be clarified, and therefore a user can easily access the operating section.

DETAILED DESCRIPTION OF THE INVENTION

Figure 1:
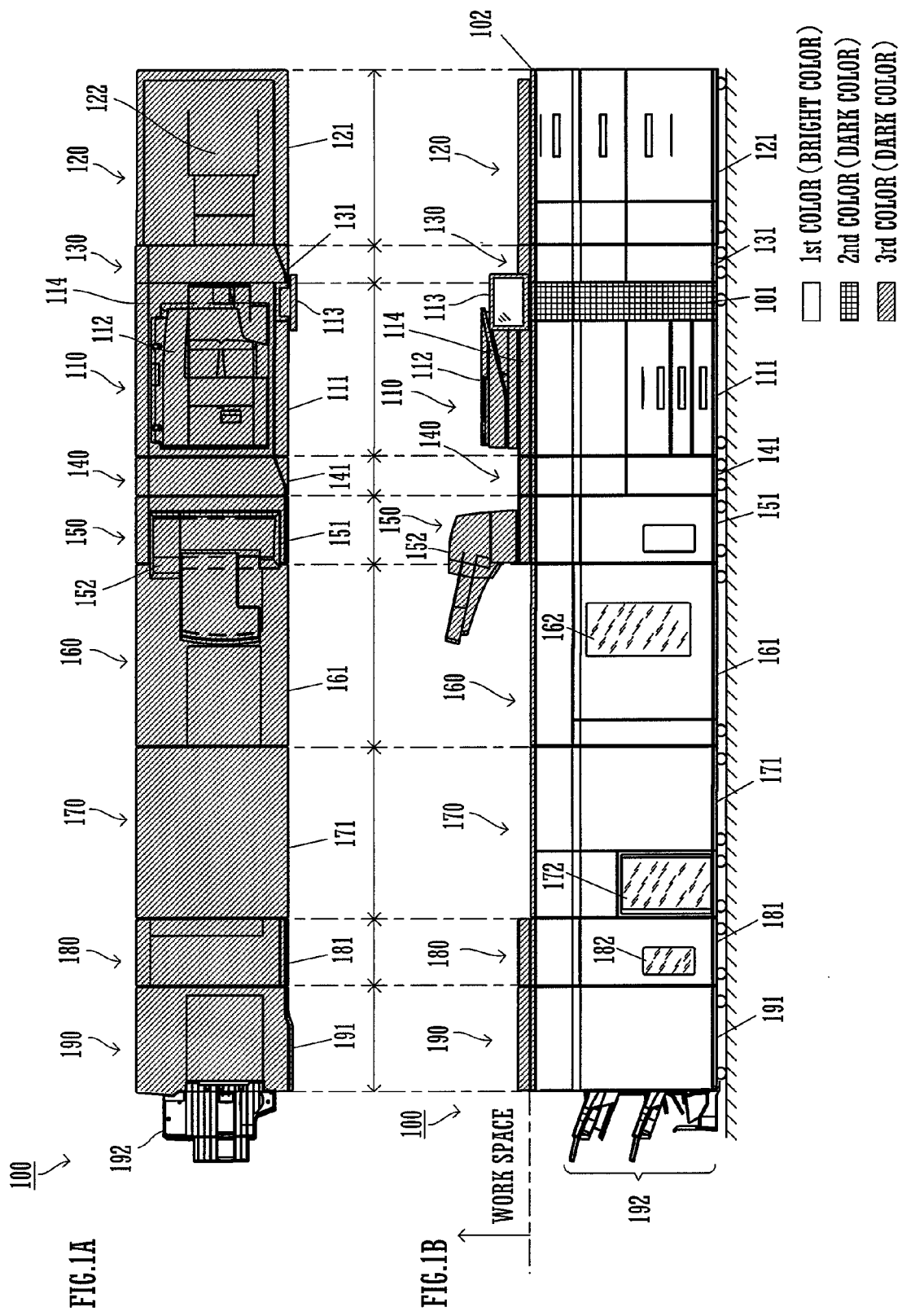
FIG. 1A is a top view of the entire apparatus, illustrating the configuration of a production print apparatus according to Embodiment 1 of the image forming apparatus of the present invention.
FIG. 1B is a front view of the entire apparatus illustrating the configuration of the production print apparatus.

The following describes one embodiment of an image forming apparatus of the present invention, exemplifying a production print apparatus additionally including an option machine on a side-face side of an enclosure of a main machine capable of functioning as a multifunction machine by itself. The present invention, however, is applicable also to an apparatus configured as a wide and all-in-one type one multifunction machine equipped with functions of option machines incorporated into a main machine.

FIG. 1A is a top view of the entire apparatus illustrating the configuration of a production print apparatus according to Embodiment 1 of the image forming apparatus of the present invention. FIG. 1B is a front view of the entire apparatus illustrating the configuration of this production print apparatus. FIG. 2 illustrates an exemplary usage form of this production print apparatus.

As illustrated in FIG. 1A and FIG. 1B, a production print apparatus 100 (hereinafter simply called "apparatus") is configured to additionally include a plurality of option machines 120 to 190 on side-face sides of an enclosure 111 of a main machine 110. With consideration given to design, the main machine 110 and the option machines 120 to 190 have enclosures of a unified height.

The main machine 110 is capable of functioning as a multifunction machine by itself. The multifunction machine refers to an apparatus capable of realizing a plurality of functions such as a copying, facsimile and printing by itself. On a top-face side of the main machine enclosure 111 are provided an auto document feeder (ADF) 112, an operating panel 113 and an OC cover 114.

The operating panel 113 is disposed at a fixed position in the width direction of the main machine enclosure 111. In the present embodiment, as illustrated in the drawing, the operating panel 113 is on a front-face side of the main machine enclosure 111 and on one lateral end part of the main machine enclosure 111 (in FIG. 1, on the right end part) for better operability of a user who stands in front of the main machine enclosure 111 and not to interfere with operations of manual feeding of a document to the auto document feeder 112 and opening/closing of the OC cover 114. The operating panel 113 may be supported by a movable arm at a forward end thereof so as to be movable from right to left or up and down within a movable range of the arm. The operating panel 113 has a tilting configuration so as to allow users in different heights to change the angle of the screen for better operability and viewability.

Exemplary option machines include a large-capacity multistage tray 120, a first buffer 130, a second buffer 140, an inserter 150, a large-capacity stacker 160, a bookbinding machine 170, a folding machine 180 and a saddle finisher 190. The large-capacity multistage tray 120 is a sheet-feeding device having a tray in which a large number of sheets are contained, and the large-capacity stacker 160 is a copy-receiving device including a stack container in which a large number of printed matters and copies are contained. The inserter 150, the bookbinding machine 170, the folding machine 180 and the saddle finisher 190 are so-called post-processors to perform various processing to printed matters and copies. Since the functions of these option machines are known, their descriptions are omitted. The first buffer 130 is provided for the purpose of matching of a sheet conveyance path between the main machine 110 and the large-capacity multistage tray 120 disposed on either side of the first buffer 130, and does not have any other special function. The same goes for the second buffer 140.

Figure 2:
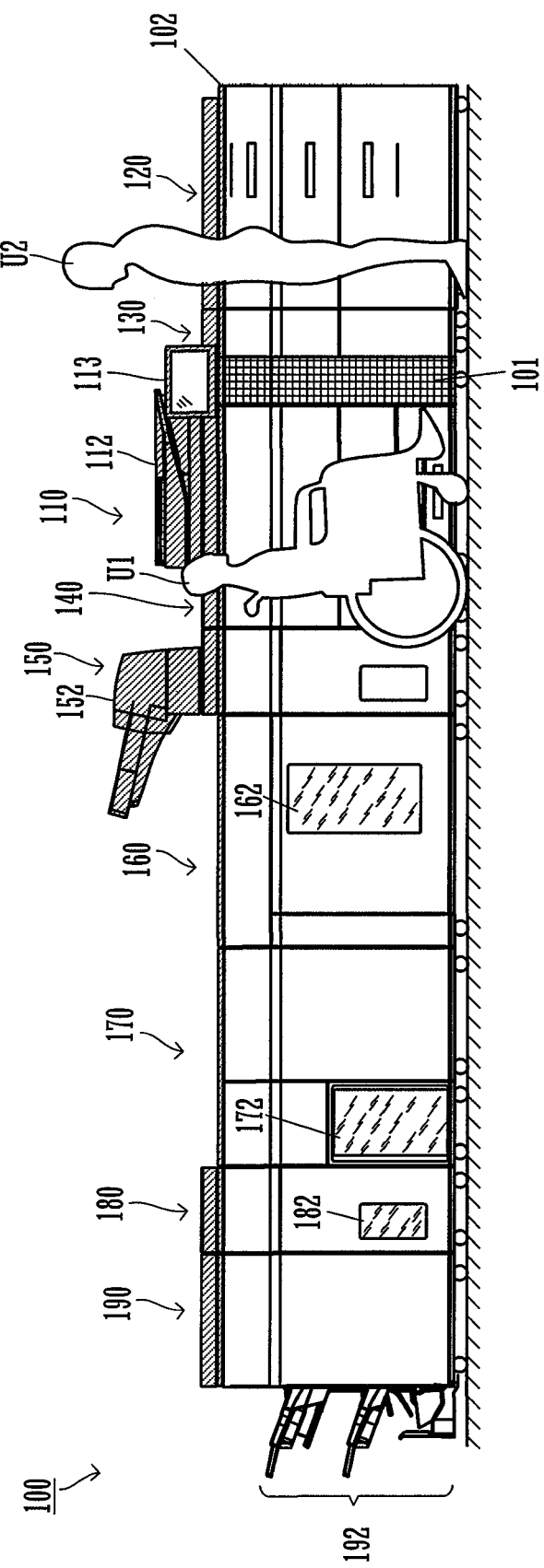
FIG. 2 illustrates an exemplary usage form of the production print apparatus.

The large-capacity multistage tray 120 and the first buffer 130 are disposed side by side on one side-face side of the main machine enclosure 111 (in FIG. 1, on the right side). On the other hand, the second buffer 140, the inserter 150, the large-capacity stacker 160, the bookbinding machine 170, the folding machine 180 and the saddle finisher 190 are disposed side by side on the other side-face side of the main machine enclosure 111 (in FIG. 1, on the left side).

The large-capacity stacker 160, the bookbinding machine 170 and the folding machine 180 are provided with vertically oriented glass windows 162, 172 and 182 on the front faces of the enclosures 161, 171 and 181, respectively, to enable checking of the loaded amount of stocked sheets. The large-capacity multistage tray 120 and the inserter 150 are provided with manual sheet-feeding sections 122 and 152 on a top-face side of their enclosures 121 and 151, respectively. The saddle finisher 190 is provided with an output tray 192 on a lateral end part of its enclosure 191.

The thus configured apparatus 100 has the overall length in breadth reaching as long as 3 m to 5 m, and is very large in size. For a color without a feeling of awkwardness so as to match with various office environments, the color of the entire apparatus is unified so that the front faces of the enclosures 111, 121, 131, 141, 151, 161, 171, 181 and 191 are in a similar tone of colors such as whitish or milky-whitish colors (see white portions without hatching in FIG. 1B (first color)). Therefore when a user is approaching the main machine 110 to operate the operating panel 113, it is difficult for the user to recognize the main machine 110 promptly.

Since the operating panel has a tilting configuration, when the operating panel is in a substantially flat state, it is more difficult for a user in a wheelchair approaching the main machine 110 from a distance to identify the main machine 110.

Then, in the present invention, in the vicinity of the operating panel 113 at the front of the main machine enclosure 111 is formed an operating position line 101 of a color (see a part with cross-hatching (second color) in FIG. 1B) clearly different from the unified color (the first color) of the front faces of the enclosures. This makes the position of the operating panel 113 clear without degrading the overall design concept of the apparatus. As a result, as illustrated in FIG. 2, an ordinary user U2 as well as a user U1 in a wheelchair can easily access the operating panel 113 using this operating position line 101 as a guide.

In the present embodiment, the operating position line 101 is formed at a position substantially agreeing with the installation position of the operating panel 113 in the width direction of the front face of the main machine enclosure 111 (i.e., the right end part), and the operating position line 101 is configured to directly indicate particularly the position of the operating panel 113 in the main machine 110. This operating position line 101 is arranged from an upper end part of the main machine enclosure 111 to reach a lower end part thereof. Such an arrangement prevents false recognition between the operating position line 101 and the glass windows 162, 172 and 182 and enables easy recognition. The operating position line 101 has any width, but preferably has a width substantially the same width of the installation width of the operating panel 113 as illustrated in the drawing because it is free from a feeling of awkwardness.

The operating position line 101 may be configured to cover a vertical conveyance path to convey a sheet from a sheet-feeding cassette of the main machine 110 to an image forming section. Such a configuration allows the main machine enclosure 111 to include a part at the operating position line 101 and another part at another section. In other words, the operating position line 101 can be manufactured as a component, and therefore there is no need to paint the main machine enclosure 111, thus facilitating the formation of the operating position line 101.

This operating position line 101 has a color (the second color) set at clearly different from the unified color (the first color) of the front faces of the enclosures. Exemplary colors include a whitish bright color as the first color (indicated as "6.8GY 8.4/1.0" in Munsell values, representing the hue of "6.8GY", the brightness of "8.4" and the saturation of "1.0") and a brownish dark color as the second color (indicated as "3Y 4/0.4" in Munsell values, representing the hue of "3Y", the brightness of "4" and the saturation of "0.4"), and such colors enable the apparatus to match with various office environments, which are muted colors without a feeling of awkwardness.

The top-face side of the enclosures of the apparatus 100 is a work space of a color (see a part with slant-hatching in FIG. 1B (third color)) clearly different from the unified color (the first color) of the front faces of the enclosures. Therefore the work space can be clear at first glance.

The third color representing the work space is used as a work space line 102 as well at an upper edge part of the front faces of the enclosures of the apparatus 100, which can be recognized even from the front face of the apparatus. The sheet-feeding section 122 of the large-capacity multistage tray 120, the OC cover 114 of the main machine 110 and the sheet-feeding section 152 of the inserter 150 can be opened/closed while letting the work space line 102 a boundary. The folding machine 180 and the saddle finisher 190 without sheet-feeding sections and OC covers above the work space line 102 are configured to be opened/closed at their upper parts of the enclosures while setting the work space line 102 as a boundary for clearing a jammed sheet, for example. In this way, the work space line 102 allows users to recognize the boundary of the open/close section.

Further a part above the work space line 102 (the enclosure top faces of the option machines) is configured to be flat, which is available as a working table for a user to sort documents and copies, for example. Therefore, even the option machines such as the large-capacity stacker 160 and the bookbinding machine 170 without open parts above the work space line 102 can be utilized as a work space for users.

The operating position line 101 and the work space line 102 may be of the same or similar colors for muted colors without a feeling of awkwardness.

Figure 3A:
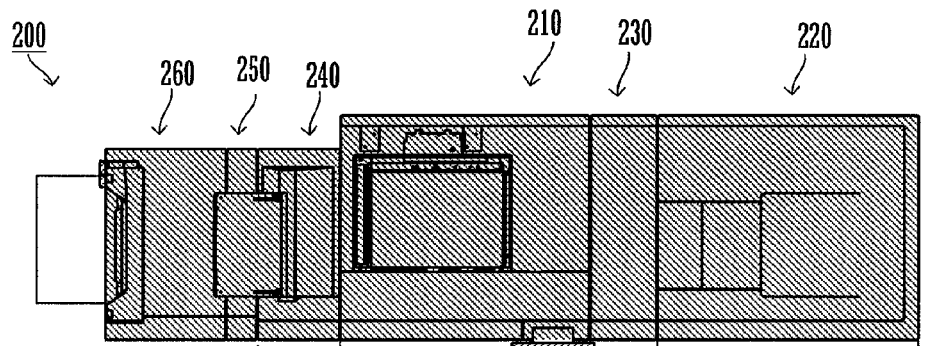
FIG. 3A is a top view of the entire apparatus, illustrating the configuration of a production print apparatus according to Embodiment 2 of the image forming apparatus of the present invention.
Figure 3B:
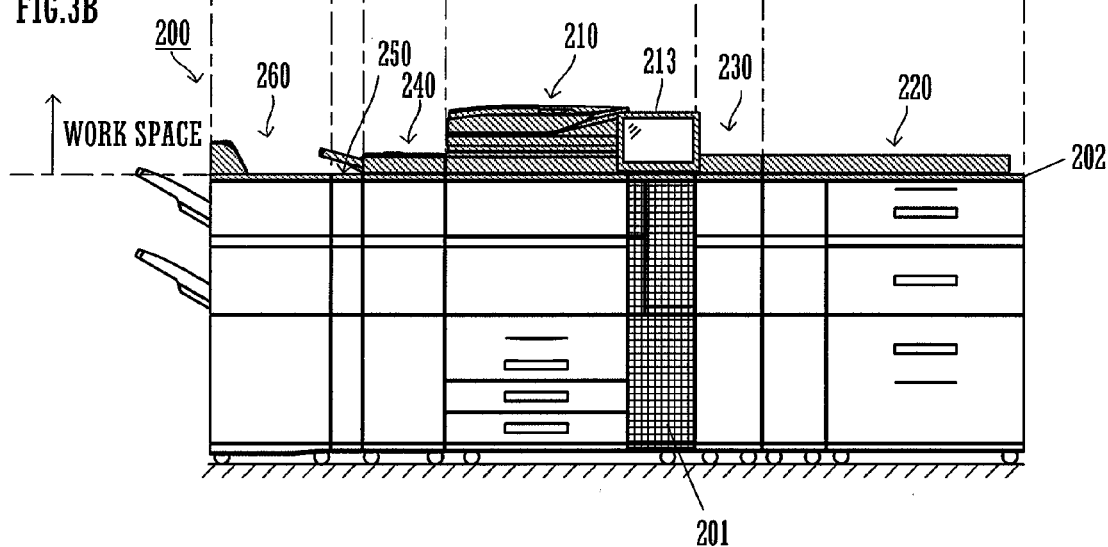
FIG. 3B is a front view of the entire apparatus illustrating the configuration of the production print apparatus.

FIG. 3A is a top view of the entire apparatus illustrating the configuration of a production print apparatus according to Embodiment 2 of the image forming apparatus of the present invention. FIG. 3B is a front view of the entire apparatus illustrating the configuration of this production print apparatus. An apparatus 200 according to the present embodiment is different from Embodiment 1 in the configuration of option machines added to a main machine 210.

That is, as illustrated in FIGS. 3A and 3B, the option machines of the apparatus 200 include a large-capacity multistage tray 220, a buffer 230, an inserter 240, a punching machine 250 and a saddle finisher 260, and has an overall length in breadth that is shorter than that of the apparatus 100 according to Embodiment 1 (see FIG. 1A and FIG. 1B). In the present embodiment as well, an operating position line 201 is provided at the front face of the enclosure of the apparatus 200, the operating position line 201 having a color clearly different from a unified color of the front faces of the enclosures of the apparatus 200, thus achieving the effect of improving accessibility to an operating panel 213 similarly to Embodiment 1. Similarly, the color of the enclosures on the top-face side is clearly different from the unified color of the enclosure front faces, or a work space line 202 also is configured in a similar manner.

In this way, although option machines may be variously combined as users demands, when a plurality of option machines with different specifications are attached as in a copy center (for example, the case where a plurality of the apparatuses 100, 200 according to Embodiment 1 and Embodiment 2 are installed at random in the same floor), the operating sections will be differently positioned among the apparatuses and so users will be confused. According to the present invention, however, even in such a case, users can access the operating sections using the operating position line as a guide, whereby they can easily access the operating sections without confusion.

The above described embodiments are to be considered in all respects as illustrative and not restrictive. The scope of the invention is indicated by the appended claims rather than by the foregoing description. All changes which come within the meaning and range of equivalency of the claims are intended to be embraced therein.

What is claimed is:

1. An image forming apparatus comprising:
   a main machine including a first enclosure enclosing an entire body of the main machine and being capable of functioning as a multifunction machine by itself; and
   at least one option machine including a second enclosure and being added to a side-face side of the first enclosure of the main machine;
   wherein:
   the main machine includes an operating section at a fixed position of a width direction of the first enclosure at an upper part of the first enclosure;
   the first enclosure has a first part, a second part, and a boundary line at a front face thereof, the first part and the second part being distinguished by the boundary line extending from the upper part to a lower part of the front face of the first enclosure,
   the first part has a first color and the second part has a second color that is clearly different from the first color, wherein the boundary line separates the first color from the second color; and
   the second part is a linear part at a position substantially agreeing with the operating section in the width direction of the first enclosure, the linear part having a constant width substantially equal to a width of the operating section and extending from the upper part to the lower part of the front face of the first enclosure.

2. The image forming apparatus according to claim 1, wherein the first enclosure of the main machine and the second enclosure of the option machine comprise a work space on a top-face side of front faces of the first and second enclosures, and the work space has a third color that is clearly different from the first color.

3. The image forming apparatus according to claim 2, wherein the first enclosure of the main machine and the second enclosure of the option machine at the upper part of the front faces are of a same color as the third color.

4. The image forming apparatus according to claim 3, wherein the first enclosure except for the upper part of the front face of the main machine and the second enclosure except for the upper part of the front face of the option machine have a unified height.

5. The image forming apparatus according to claim 4, wherein the second color and the third color are a same or similar color.

6. An image forming apparatus comprising:
- a main machine including a first enclosure enclosing an entire body of the main machine and being capable of functioning as a multifunction machine by itself; and
- at least one option machine including a second enclosure and being added to a side-face side of the first enclosure of the main machine;

wherein:
the main machine includes an operating section at a fixed position of a width direction of the first enclosure at an upper part of the first enclosure;
the first enclosure has a first color at a front face thereof except for a part, and the part of the front face of the first enclosure is in its entirety a second color that is clearly different from the first color; and
the part is a linear part at a position substantially agreeing with the operating section in the width direction of the first enclosure, the linear part having a constant width substantially equal to a width of the operating section and extending from immediately below the operating section to a bottom part of the front face of the first enclosure.

7. The image forming apparatus according to claim 1, wherein the operating section is disposed on a lateral part of the first enclosure in the width direction of the first enclosure.

8. The image forming apparatus according to claim 1, wherein the second part covers a vertical conveyance path to convey a sheet from a sheet-feeding cassette in which sheets are contained to an image forming section.

9. The image forming apparatus according to claim 1, wherein the first enclosure includes the first part and the second part that are manufactured as separate components.

10. The image forming apparatus according to claim 1, wherein the operating section is an operating panel with a tilting configuration.

11. The image forming apparatus according to claim 1, wherein the upper part of the front face of the first enclosure has the second color and includes an open/close section that is openable and closable above the upper part.

12. The image forming apparatus according to claim 1, wherein: an upper part of a front face of the at least one option machine has the second color.

13. The image forming apparatus according to claim 1, wherein the upper part of the front face of the first enclosure and the upper part of the front face of the at least one option machine are aligned in height.

14. The image forming apparatus according to claim 6, wherein the part covers a vertical conveyance path to convey a sheet from a sheet-feeding cassette in which sheets are contained to an image forming section.

15. The image forming apparatus according to claim 6, wherein the first enclosure includes the part and another part that are manufactured as separate components.

16. The image forming apparatus according to claim 6, wherein the operating section is an operating panel with a tilting configuration.

17. The image forming apparatus according to claim 6, wherein the upper part of the front face of the first enclosure has the second color and includes an open/close section that is openable and closable above the upper part.

18. The image forming apparatus according to claim 6, wherein: an upper part of a front face of the at least one option machine has the second color.

19. The image forming apparatus according to claim 6, wherein the upper part of the front face of the first enclosure and the upper part of the front face of the at least one option machine are aligned in height.

* * * * *